May 12, 1970          A. WINSEL          3,511,711

PROCESS FOR PRODUCING ELECTRICAL ENERGY IN A FUEL CELL

Filed Nov. 14, 1966          3 Sheets-Sheet 1

INVENTOR.
AUGUST WINSEL
BY
ATTORNEY.

May 12, 1970    A. WINSEL    3,511,711

PROCESS FOR PRODUCING ELECTRICAL ENERGY IN A FUEL CELL

Filed Nov. 14, 1966    3 Sheets-Sheet 3

INVENTOR
AUGUST WINSEL
BY
ATTORNEY

United States Patent Office 3,511,711
Patented May 12, 1970

3,511,711
PROCESS FOR PRODUCING ELECTRICAL ENERGY IN A FUEL CELL
August Winsel, Kelkheim, Germany, assignor to Siemens Aktiengesellschaft, Berlin, Germany, and Varta Aktiengesellschaft, Frankfurt am Main, Germany, both corporations of Germany
Filed Nov. 14, 1966, Ser. No. 593,896
Claims priority, application Germany, Nov. 13, 1963, S 100,490
Int. Cl. H01m 27/12
U.S. Cl. 136—86     5 Claims

ABSTRACT OF THE DISCLOSURE

In an electrochemical process for converting an oxidizable fuel to electric energy in a fuel cell, the fuel cell being constructed with a porous, catalytically active gas diffusion electrode of substantial uniform hydrophobicity having intercommunicating large and small pores randomly distributed throughout the electrode, the method which comprises flowing electrolyte through the large pores through the electrode under a pressure sufficient to overcome the capillary pressure and the gas pressure while flowing the gaseous reactant through the small pores through the electrode, the gas and electrolyte flow being independent from each other. The electrode for carrying out the process and the fuel cell comprising such electrode.

---

The invention deals with devices useful in the field of electrochemical conversions of fuels to electrical energy. The invention relates to fuel cells having hydrophobic, porous electrodes, to batteries comprising such cells, and to a process of using them. The devices of the invention are characterized by hydrophobic electrodes which exhibit two different degrees of capillary pressure when in contact with a liquid electrolyte under pressure. In the process of the invention, there is established an equilibrium within the electrode between the electrolyte, under pressure, within the larger pores of the electrode and the gas within the smaller pores of the electrode. The devices and process represent an unexpected advance over the prior art.

One type of fuel cells of the prior art comprises porous hydrophobic electrodes which serve as a separatory wall between the gas chamber and the electrolyte chamber. The three phase boundary between the gaseous reactant, the electrolyte and the catalyst material establishes itself, under the effect of the hydrostatic pressure of the electrolyte only in the interior of the large pores. The reaction zone formed in this manner does not permit loading the electrode with higher current densities. It is therefore preferred in many instances to use electrodes which comprise a layer of lesser hydrophobicity or a hydrophilic layer on the side facing the electrolyte, and a hydrophobic layer of higher hydrophobicity on the side facing the gas chamber.

The degree of hydrophobicity desired in a given electrode zone can be achieved by covering a corresponding proportion of the inner surface in that zone by a hydrophobic agent. The manufacturing of such electrodes is however, relatively difficult. To obtain the desired degree of coverage by the deposition of a hydrophobic agent, such as paraffine from benzene solution, is as difficult as is the manufacture of such electrodes from a mixed powder which contains a proportion of hydrophobic plastic, such as polyethylene. The difficulty resides in the fact that the plastic content must be increased from the electrolyte face toward the gas face of the electrode. In practice, such electrodes can be made by a method in which individual layers having a gradually increasing plastic content are stacked to form a composite electrode. This is a tedious and expensive method which has the further shortcoming that the plastic content is limited since the electrode body must remain electrically conducting in each of these layers or zones, i.e. there is a practical limit to the proportion of the plastic powder which can be admixed to the conducting material of which the electrode is made. Some of the problems with making hydrophilic electrodes hydrophobic are described in U.S. Pats. 3,258,363 and 3,242,011 and 3,238,068.

It was therefore an object to find a fuel cell and a fuel cell battery comprising porous, hydrophobic electrodes which do not have the disadvantages described hereinbefore, and in which electrodes may be used which have been produced by simple methods.

In the fuel cell and fuel cell battery of the invention the electrode possesses substantially uniform hydrophobicity in all areas without reduction of the effective length of the three phase boundary essential for the electrode reaction by the limitation of the depth of penetration of the electrolyte in the electrode pores.

In accordance with the present invention there are provided in a fuel cell battery porous, hydrophobic electrodes in which the electrolyte which is under a hydrostatic pressure, penetrates against the capillary depression, into part of the electrode pores, namely the larger pores. The electrodes of the invention are electrically conductive, hydrophobic electrodes which comprise intercommunicating large and small pores randomly distributed throughout the electrodes. The electrodes used in fuel cells and batteries of the invention are free of distinct, individual hydrophobic layers but possess throughout, upon microscopic examination, a substantially uniform overall hydrophobic character and two different and distinguishable degrees of capillary pressures attributable to the two sizes of pores. The electrodes are made of hydrophobic or of such a mixture of hydrophobic and hydrophilic materials that the resulting electrode material is hydrophobic substantially uniformly throughout so that the inner surface of the electrode is not completely wetted by the electrolyte.

In an advantageous embodiment of the invention, porous diaphragms containing liquid electrolyte are sandwiched in the spaces in and between the electrodes. The diaphragms are electrically non-conductive, hydrophilic or hydrophobic with pores large enough to allow for the free flow of electrolyte from one electrode of one polarity to the next electrode of a different polarity.

In another desirable embodiment of the invention, there are provided fine porous hydrophobic means arranged between the gas space and the electrolyte and having a capillary depression high enough to prevent the flow of electrolyte from the electrode into the gas space on one side of the electrode or into the gas conduit.

In the electrochemical process of the invention an oxidizable fuel, of a known type, is converted directly to electrical energy in a fuel cell comprising at least one electrode of the type described, an electrolyte and a gas which is an oxidizable fuel gas or an oxidizing gas. The process comprises flowing electrolyte through the group of larger pores under a pressure sufficient to overcome the capillary pressure of this group of pores and the gas pressure, while forcing the gas through the small pores of the electrode. In this manner, the three phase reaction boundary between the catalyst in the electrode, the electrolyte and the gas is established throughout the electrode at the openings of the small pores into the large pores. Thus with varying electrolyte pressure, there results a controllable movable three phase boundary within the electrode. In this manner also the concentration polarization in the gas and electrolyte pores can be effectively reduced.

Figure 1:
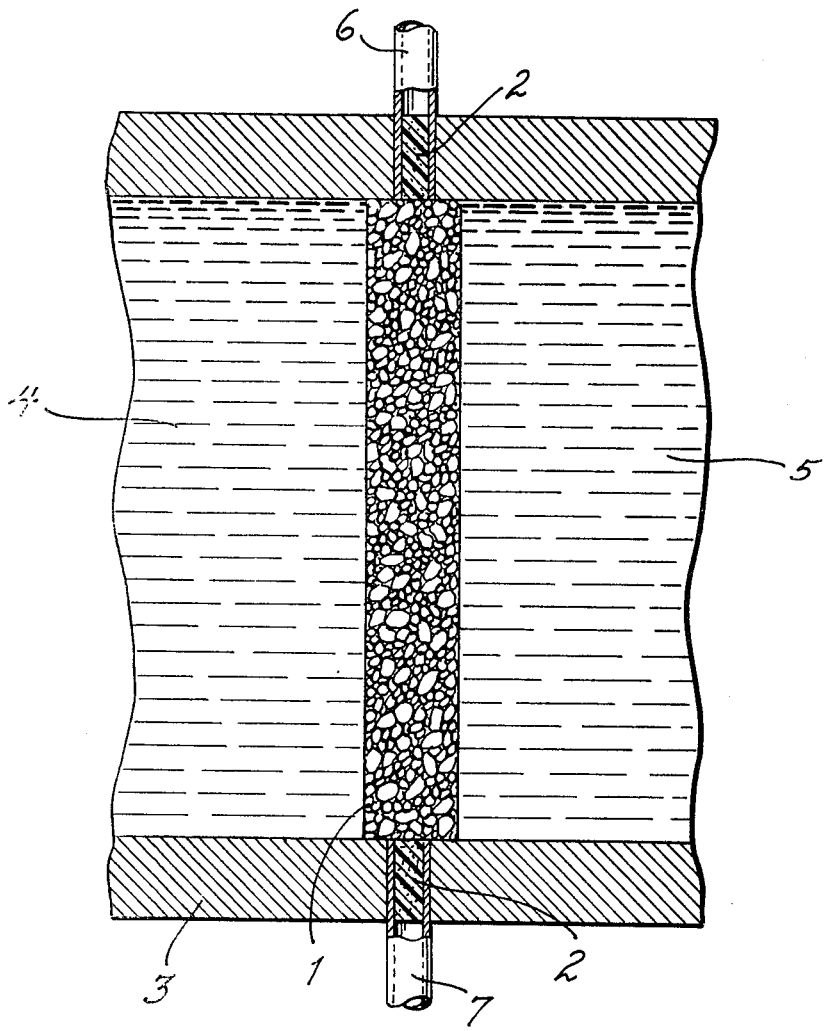
FIG. 1 is a diagrammatic side-view of a cell of the invention.

In accordance with the invention, a defined hydrophobic gas diffusion electrode can be operated by the application of a hydrostatic pressure P in the electrolyte, so that the electrolyte penetrates against the pressure $p$ of the gas and against the capillary depression $p_K$ into part of the pores. In this manner, at first only the larger pores of the electrode, which have a smaller capillary depression, are filled, as the hydrostatic pressure of the electrolyte increases. During the operation, the small pores remain filled with gas because of their larger capillary depression, since the capillary pressure $p_K$ for hydrophobic bodies is described by the equation $$p_K = -\frac{2\sigma}{r}|\cos\theta|$$

wherein $\sigma$ is the surface tension of the electrolyte, and $\theta > 90°$ is the contact angle. The capillary pressure $p_K$ is negative, and is therefore designated a depression. All those pores are filled with electrolyte, which have a radius satisfying $$r \geq -\frac{2\sigma(\cos\theta)}{P-p}$$

In this manner, by suitably proportioning the amount of large and small pores and their respective sizes and the electrolyte pressure, by known methods, optimum conditions for the particular situation desired are readily ascertainable.

An increase of the hydrostatic pressure of the electrolyte has the effect of increasing the pore volume which is filled with electrolyte, and thus increasing also the effective three phase boundary which establishes itself at the openings of the finer, gas filled pores at their connections into the larger electrolyte filled pores.

If a very hydrophobic material is selected for the construction of the electrode that would require hydrostatic operating pressure beyond those desirable, the desired amount of a surface active agent may be used in the aqueous electrolyte. Such agents are described in U.S. Pat. 3,258,364. They can be used herein in an amount insufficient to render $p_K$ a positive value, thus maintaining the general hydrophobic character of the electrode.

The fuel battery of the invention generally comprises a plurality of the type of hydrophobic electrodes described above. It need, however, contain only such hydrophobic electrodes of one polarity; the other electrodes can be hydrophilic electrodes. The gas pressure of these hydrophilic electrodes must be correspondingly higher than the gas pressure of hydrophobic electrodes in order to overcome the difference in the capillary pressures.

It is desirable to prevent that the electrolyte penetrates into the gas spaces which are provided outside of the electrodes. This can be achieved by separating the gas spaces from the pores which are filled with the electrolyte under the hydrostatic pressure, by porous layers which have a suitably low capillary pressure as compared with the gas pressure in order to prevent the penetration of the electrolyte at the applied hydrostatic pressures. Such hydrophobic gas filled layers or separators can be of any suitable type, such as paper, cloth, asbestos made hydrophobic by impregnation with suitable materials like resins or waxes.

Generally this is readily achieved if the resistance to the flow of the electrolyte between the electrode areas and the open gas spaces is high enough to keep back the bulk of the electrolyte, permitting only the passage of smaller proportions through some of the larger pores into the gas space.

Often it is also possible to omit these hydrophobic separating means. This is particularly the case where the resistance to electrolyte flow from electrode to electrode (or from one diaphragm to the next, when diaphragms used) is small in comparison to the resistance to radial electrolyte flow within the electrode. In such a case, too, it is sufficient to provide a reservoir and a small pumping device which returns the collected electrolyte to the main electrolyte reservoir.

The construction of the fuel cell batteries of the present invention in the preferred case, where double sided gas diffusion electrodes are used, can be simplified by occupying the spaces between the electrodes by diaphragms which take up the electrolyte and which counteract the forces acting upon the electrodes.

These diaphragms are electrically non-conductive and electrolytically porous, i.e. either hydrophilic or hydrophobic with pores sufficiently large to allow the electrolyte to flow through. They can be made of known conventional materials which are used in accumulator art as separators, for instance asbestos, cellulosic materials, resinous fiber like polyvinyl chloride, cellulose acetate and others.

The battery of the invention is advantageously supplied with a forwarding means, which is capable of producing a pressure differential between the various electrolyte areas in the battery. Under the effect of the pressure differential which is superimposed into the constant hydrostatic pressure, the electrolyte flows through the electrodes counteracting the concentration polarization by removing and carrying away the reaction water from the places where it is formed.

The catalytic materials used for oxygen cathodes are known. See for instance U.S. Pats. 3,239,382; 3,226,261. There may be used the following: silver, platinum, carbon, Spinel catalyst e.g. cobalt aluminum Spinel. Likewise mixtures of these such as carbon and silver or carbon coated with platinum or silver. With the hydrophilic metallic components of the electrode there are admixed hydrophobic components such as polyethylene, polypropylene, tetrafluoroethylene, acrylates, vinyl resins and other like hydrophobic synthetic resins. Also the hydrophilic component of the electrode material can be evenly coated with hydrophobic material such as the above resins or paraffin.

For the hydrogen electrode the catalyst material is also known and includes those of the subgroup VIII and Ib of the periodic system including: iron, cobalt, nickel, ruthenium, osmium, rhodium, palladium, platinum, iridium, gold, silver and copper. The metals may be precipitated on such carriers as carbonyl nickel, carbon powder; Raney metals or their alloys are also suitable.

The metals are mixed with the desired amount of hydrophobic material, and known decomposable or removable fillers (pore formers) may be used, pressed and sintered to the desirable electrode shape.

The electrolytes for use in the battery are known. Useful for instance are 2 N to 10 N potassium hydroxide or sodium hydroxide solutions.

The following examples are merely illustrative of the invention.

EXAMPLES 18 gr. of active carbon (grain size $<60\mu$) and 6 gr. of active carbon (grain size between 60 and $90\mu$) are well mixed with 6 gr. of high molecular weight, low pressure polyethylene, 15 gr. of silver oxide powder and 10 gr. of $Na_2CO_3$ powder. The mixture is pressed into a disk of 71 mm. diameter at 180° C. under 1.5 tons for 10 minutes. The catalytically active disk is clamped in an electrolyte container and operated as an oxygen-reducing electrode under an oxygen pressure of 1.5 atm. under a cathodic load of 70 ma./cm.² at room temperature and up to 70° C. for several months in strongly alkaline electrolyte. The electrolyte was maintained under a pressure of 2.6 atm. Losses due to polarization remained limited and constant.

The electrode did not change its physical shape and was capable of electrochemically converting 80% of the oxygen supplied to it.

The following figures show further the operation of the electrodes of the invention.

FIG. 1 shows the double sided hydrophobic gas diffusion electrode 1 which is enclosed by electrolyte vessel 3. The electrode 1 separates the electrolyte chambers 4 and 5 in which the electrolyte is maintained under the hydrostatic pressure P.

The gas is introduced over pipe 6, e.g. under normal pressure $p$, and removed through pipe 7.

The gas passes from tube 6 through a finely porous hydrophobic separator 2 into the fine, gas filled pores of the electrode and from there through separator 2' into the outlet pipe 7. The finely porous separators 2 and 2' may surround the whole edge of the electrode. Thus, the interior of electrode 1 is not connected to the outside by pores which are large enough to be filled, at hydrostatic pressure P continuously with electrolyte.

Figure 2:
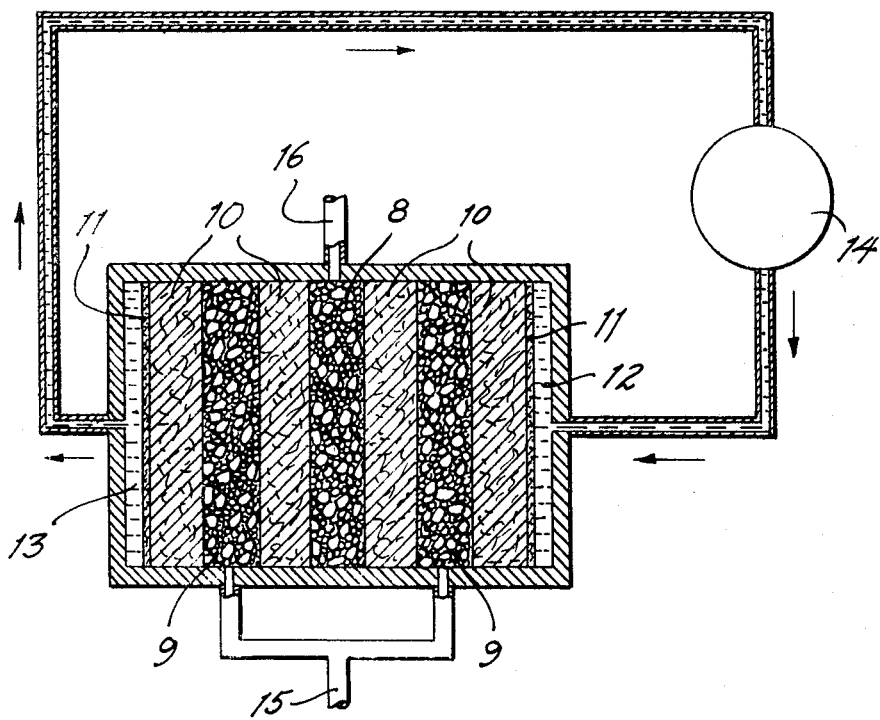
FIG. 2 is a diagrammatic side-view of a battery of the invention.

FIG. 2 shows a battery assembly of the invention in which 8 represents the hydrogen electrodes, 9 the oxygen electrode both having interpenetrating systems of large and small pores, 10 the porous diaphragm for the electrolyte, 11 represents the separator which prevents the flow of electrolyte into the gas space, 12 and 13 the electrolyte spaces, 14 a circulatory pump, 15 means for supplying the hydrogen to the hydrogen electrode. The battery was operated with electrolyte under pressure.

Figure 3:
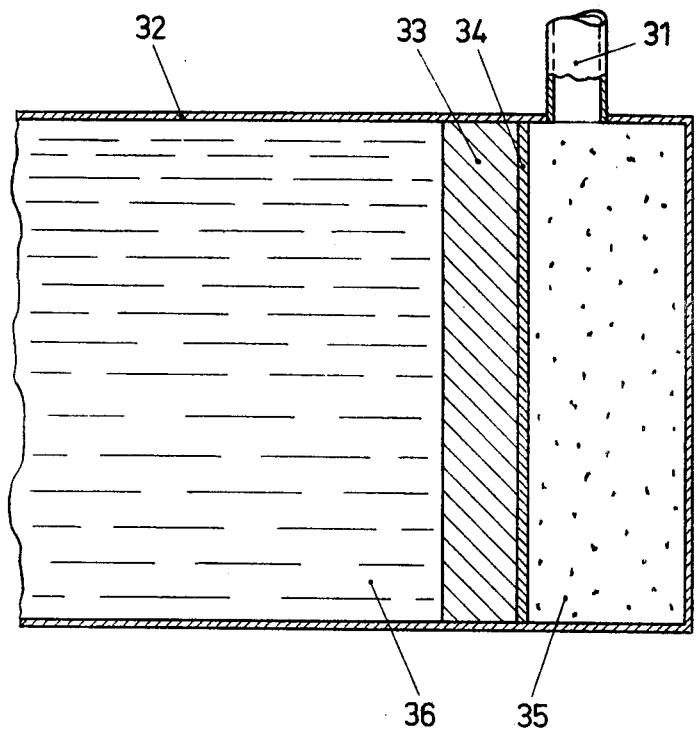
FIG. 3 is a dagrammatic vertical section of a fuel cell of the invention.

FIG. 3 shows a diagrammatic view of a fuel cell of the invention.

The gas diffusion electrode consists of the two layers 33 and 34 and is disposed in the cell housing 32 in such a manner, that it separates the electrolyte space 36 from the gas space 35, to which the gaseous fuel or oxidant is supplied through the pipe 31.

Both layers 33 and 34 are hydrophobic and may either be firmly affixed to each other or may be pressed together by a suitable holder. Layer 33 is hydrophobic and electrically conductive and contains a fuel catalyst or a catalyst for the electrochemical conversion of the oxidant. Layer 33 comprises two interpenetrating systems of small and large pores. Layer 34 serves to substantially prevent the penetration of electrolyte into the gas space 35. This is achieved by means of the high capillary depression in the fine pores of this hydrophobic layer. In this way electrolyte which reaches the intersurface between layers 33 and 34 by way of the coarse pores of layer 33 is prevented to enter the fine pores of layer 34, which are filled with the gaseous fuel or oxidant. Layer 34 may be electrically conductive but need not contain a catalyst.

The electrodes of the invention can be a hydrophobic fuel electrode to which a reaction gas is delivered or a hydrophobic electrode to which oxygen or an oxygen containing gas is supplied. Useful combustible gases include hydrogen, methane, carbon monoxide, ethylene and the like, as disclosed in U.S. Pats. 2,946,836; 3,238,066 which are incorporated herein by reference.

The hydrophobic character of the electrodes may be diminished after extended use, especially when strongly alkaline electrolytes are used. It is a particular advantageous aspect of the present invention that this can be simply compensated by a corresponding decrease in the hydrostatic pressure of the electrolyte.

It is indeed noteworthy that with materials which are of proven value to the electrochemical field, a fuel cell system has been discovered in which a highly efficient electrochemical reaction can be carried out within hydrophobic electrodes riddled concurrently with a system of connecting pores filled with electrolyte and gas.

Other known aspects of the fuel cell art are incorporated herein by reference as for instance to U.S. Pats. 3,250,646 and 3,248,267.

I claim:

1. In an electrochemical process for converting an oxidizable fuel to electrical energy in a fuel cell using at least one gaseous reactant which comprises at least one hydrophobic, electrically conductive, porous catalytically active gas diffusion electrode which comprises intercommunicating large and small pores randomly distributed throughout the electrode and an electrolyte, the process which comprises flowing electrolyte under a pressure sufficient to fill the large pores of the electrode and through the large pores from one face of the electrode to the other face while passing the gas separately through the small pores of the electrode, thereby establishing a three-phase reaction boundary between the catalyst in the electrode, the electrolyte and the gas throughout the electrode at the openings of the small pores into the large pores where contact of these three elements is established, the electrolyte being in the large pores and the gas in the small pores, said three-phase boundary being controllably movable within the entire electrode dependently on the electrolyte pressure.

2. In an electrochemical process for converting an oxidizable fuel to electrical energy in a fuel cell using at least one gaseous reactant, the fuel cell comprising an electrolyte and at least one electrically conductive, porous catalytically active gas diffusion electrode of substantial uniform hydrophobicity in all areas of the electrode having intercommunicating large and small pores randomly distributed throughout the hydrophobic electrode, said electrode having a capillary pressure $$p_K = -\frac{2\sigma}{r} | \cos \theta$$

in which $\theta$ is the surface tension of the electrolyte and $\theta > 90°$ is the contact angle between the electrolyte and the walls of the pores of the electrode, the process which comprises, while the electrochemical conversion takes place, establishing an electrolyte pressure sufficient to cause filling with electrolyte essentially all large pores of the electrode which have a radius satisfying the equation $$r \geq -\frac{2\sigma (\cos \theta)}{P-p}$$

wherein P is the hydrostatic pressure and $p$, the gas pressure, and flowing said electrolyte through said large pores through the electrode from one face of the electrode to the opposite face thereof under a pressure sufficient to overcome the capillary pressure of the large pores and the gas pressure prevailing in the small pores, while establishing independently from said electrolyte pressure, a gas pressure sufficient to cause filling of the small pores with the gaseous reactant, and flowing said gas through said small pores through the electrode independently from the electrolyte flow, and establishing the three-phase reaction boundary of the catalyst, electrolyte and the gaseous reactant throughout the electrode at the openings of the small pores into the large pores where contact of said three elements is established, the electrolyte being in the large pores and the gas in the small pores, said three-phase boundary being controllably movable within the entire electrode dependently on the electrolyte pressure.

3. The process of claim 2 in which the gaseous reactant is oxygen.

4. The process of claim 2 which is carried out in a fuel cell battery having a multiplicity of such electrodes separating a multiplicity of electrolyte compartments, the electrolyte flowing sequentially through the large pores of said electrodes.

5. The process of claim 4 which is carried out in a battery which also comprises a multiplicity of electrolyte-permeable porous, electrically non-conductive diaphragms filled with electrolyte sandwiched and in contact between each two neighboring electrodes, the electrolyte flowing sequentially through the large pores of the electrodes and the pores of said diaphragms.

References Cited

UNITED STATES PATENTS

| | | | |
|---|---|---|---|
| 2,860,175 | 11/1958 | Justi | 136—86 X |
| 3,116,170 | 12/1963 | Williams et al. | 136—86 |
| 3,227,585 | 1/1966 | Langford et al. | 136—86 |
| 3,261,717 | 7/1966 | Shropshire et al. | 136—86 |
| 3,323,951 | 6/1967 | Kreiselmaier | 136—86 X |
| 3,350,232 | 10/1967 | Ryhiner et al. | 136—86 |
| 3,002,039 | 9/1961 | Bacon | 136—86 |
| 3,097,974 | 7/1963 | McEvoy et al. | 136—86 X |
| 3,098,762 | 7/1963 | Roblee, et al. | 136—86 X |
| 3,188,242 | 6/1965 | Kordesch et al. | 136—86 |
| 3,202,546 | 8/1965 | Rightmere et al. | 136—86 |
| 3,220,937 | 11/1965 | Friese et al. | 136—86 X |
| 3,284,243 | 11/1966 | Von Sturm | 136—86 X |
| 3,364,070 | 1/1968 | Alexander | 136—86 |

FOREIGN PATENTS

| | | |
|---|---|---|
| 931,732 | 7/1963 | Great Britain. |
| 1,363,854 | 5/1964 | France. |

OTHER REFERENCES

Paxton et al.: Porous Carbon Gas Diffusion Electrodes in "Journal of Electrochemical Society," vol. 110, No. 8, August 1963 (only pp. 932, 933, 936, 937 relied on).

Adams et al.: Fuel Cells For the Future, October 1960, only pp. 17, 18, 28, 31, 33 relied upon.

ALLEN B. CURTIS, Primary Examiner

U.S. Cl. X.R.

136—160